United States Patent
Shiraki et al.

(10) Patent No.: US 8,895,857 B2
(45) Date of Patent: Nov. 25, 2014

(54) FLAME-RETARDANT COMPOSITION AND INSULATED WIRE, AND METHOD FOR PRODUCING FLAME-RETARDANT COMPOSITION

(75) Inventors: Kousuke Shiraki, Yokkaichi (JP);
Masashi Sato, Yokkaichi (JP);
Tomonori Inagaki, Yokkaichi (JP);
Masashi Kimura, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 376 days.

(21) Appl. No.: 12/811,916

(22) PCT Filed: Jan. 20, 2010

(86) PCT No.: PCT/JP2010/050601
§ 371 (c)(1),
(2), (4) Date: Jul. 7, 2010

(87) PCT Pub. No.: WO2010/087254
PCT Pub. Date: Aug. 5, 2010

(65) Prior Publication Data
US 2011/0056728 A1 Mar. 10, 2011

(30) Foreign Application Priority Data
Jan. 30, 2009 (JP) ................................. 2009-019212

(51) Int. Cl.
| | | |
|---|---|---|
| *H01B 3/44* | (2006.01) | |
| *H01B 7/295* | (2006.01) | |
| *C08J 3/20* | (2006.01) | |
| *C08L 23/06* | (2006.01) | |
| *C08L 23/08* | (2006.01) | |
| *C08K 3/22* | (2006.01) | |
| *C08K 5/13* | (2006.01) | |
| *C08K 5/34* | (2006.01) | |
| *C08K 5/36* | (2006.01) | |
| *C08K 5/54* | (2006.01) | |
| *C08K 5/57* | (2006.01) | |

(52) U.S. Cl.
CPC . *H01B 7/295* (2013.01); *C08J 3/20* (2013.01); *C08L 23/06* (2013.01); *C08L 23/0892* (2013.01); *H01B 3/441* (2013.01); *C08J 2323/06* (2013.01); *C08K 3/22* (2013.01); *C08K 5/13* (2013.01); *C08K 5/34* (2013.01); *C08K 5/36* (2013.01); *C08K 5/54* (2013.01); *C08K 5/57* (2013.01); *C08L 2312/08* (2013.01)
USPC ................................ 174/110 PM; 174/121 A

(58) Field of Classification Search
USPC .................... 174/110 SR, 110 PM, 121 A
See application file for complete search history.

(56) References Cited

U.S. PATENT DOCUMENTS

| | | | | |
|---|---|---|---|---|
| 4,549,041 A | * | 10/1985 | Shingo et al. | 174/113 R |
| 4,769,179 A | * | 9/1988 | Kato et al. | 252/609 |
| 6,059,095 A | * | 5/2000 | Tsuji | 198/780 |

FOREIGN PATENT DOCUMENTS

| | | |
|---|---|---|
| DE | 11 2008 001 402 T5 | 6/2012 |
| JP | A-2001-172442 | 6/2001 |
| JP | A-2006-348136 | 12/2006 |
| JP | A-2008-297453 | 12/2008 |
| WO | WO 2008/146921 A1 | 12/2008 |

OTHER PUBLICATIONS

Mar. 6, 2012 Office Action issued in German Patent Application No. 11 2010 000 002.6 (with translation).
International Search Report mailed on Mar. 9, 2010 in corresponding International Application No. PCT/JP2010/050601 (with translation).
Chinese Office Action issued on May 3, 2012 for Chinese Patent Application No. 201080001261.5 (with translation).
Dec. 20, 2012 Office Action issued in Chinese Patent Application No. 201080001261.5 (with Translation).
Jan. 27, 2014 Notification of the Fourth Office Action issued in Chinese Application No. 201080001261.5 with English-language translation.
Sep. 3, 2013 Notification of Reason(s) for Refusal issued in Japanese Application No. 2009-019212 with English-language translation.
Jul. 9, 2013 Notification of the Third Office Action issued in Chinese Application No. 201080001261.5 with English-language translation.

* cited by examiner

*Primary Examiner* — Chau N Nguyen
(74) *Attorney, Agent, or Firm* — Oliff PLC

(57) ABSTRACT

A flame-retardant composition that is more excellent in heat resistance than a conventional flame-retardant composition. The flame-retardant composition contains silane-crosslinked polyolefin, polyolefin, a metallic hydrate, a phenolic antioxidant, a sulfurous antioxidant, a metallic oxide, and a copper inhibitor. The sulfurous antioxidant is preferably a benzimidazole compound, and the metallic oxide is preferably a zinc oxide. The silane-crosslinked polyolefin is preferably polyethylene having a density of 0.880 to 0.910 g/cm$^3$ that is silane-crosslinked. The polyolefin is preferably polyethylene having a density of 0.880 to 0.910 g/cm$^3$, or an olefin elastomer having a melting point of 140° C. or more.

3 Claims, No Drawings

FLAME-RETARDANT COMPOSITION AND INSULATED WIRE, AND METHOD FOR PRODUCING FLAME-RETARDANT COMPOSITION

TECHNICAL FIELD

The present invention relates to a flame-retardant composition and an insulated wire including the same, and a method for producing a flame-retardant composition, and more specifically relates to a flame-retardant composition suitably used as a covering material of an insulated wire that is favorably used in a location such as an engine room of an automobile where high heat resistance is required of the insulated wire, and an insulated wire including the same, and a method for producing such a flame-retardant composition.

BACKGROUND ART

Conventionally, high heat resistance is required of an insulated wire for use in high temperature environment such as an engine room of an automobile. For this reason, as a covering material of the insulated wire for use in such a location, crosslinked polyvinylchloride and crosslinked polyethylene that are crosslinked in an electron irradiation crosslinking method, for example, are used.

Since reduction of a halogen-containing material such as polyvinyl chloride has recently been called for from the viewpoint of reducing loads on the global environment, the halogen-containing material has been replaced with a material that contains no halogen element such as polyethylene. In order that the material that contains no halogen element may secure sufficient flame retardancy, a metal hydroxide such as a magnesium hydroxide is often added to the material as a flame retardant.

For example, PTL 1 discloses that a non-halogenous flame-retardant resin composition that includes polyolefin containing 30 to 80% by mass of a silane-crosslinking ethylene-vinyl acetate copolymer as an essential component, a metal hydroxide, and a flame-retardant auxiliary agent, the metal hydroxide content being 60 to 150 parts by mass and the flame-retardant auxiliary agent content being 5 to 10 parts by mass with respect to 100 parts by mass of the polyolefin is crosslinked to be used as a covering material of an insulated wire.

CITATION LIST

Patent Literature

PTL1: Japanese Laid-Open Patent Publication No. 2001-172442

SUMMARY OF INVENTION

Technical Problem

However, while a conventional insulated wire is improved in heat resistance by being crosslinked, an allowable temperature limit thereof is at most 120° C. according to the ISO standard. For the purpose of enhancing performance of an automobile, the need for an insulated wire that is more excellent in heat resistance is growing, and a material having an allowable temperature limit of 150° C. according to the ISO standard is expected to be developed.

Objects of the present invention are to provide a flame-retardant composition that is more excellent in heat resistance than a conventional flame-retardant composition, an insulated wire that is more excellent in heat resistance than a conventional insulated wire, and a method for producing a flame-retardant composition by which a flame-retardant composition that is more excellent in heat resistance than a conventional flame-retardant composition can be obtained.

Solution to Problem

To achieve the objects and in accordance with the purpose of the present invention, a flame-retardant composition according to a preferred embodiment of the present invention contains a polymer component including silane-crosslinked polyolefin and polyolefin, the polyolefin content being 32 to 157 parts by mass with respect to 100 parts by mass of the silane-crosslinked polyolefin, magnesium hydroxide and/or aluminum hydroxide, the content of the magnesium hydroxide and/or aluminum hydroxide being 28 to 190 parts by mass with respect to 100 parts by mass of the polymer component, a phenolic antioxidant, the phenolic antioxidant content being 0.5 to 9.5 parts by mass with respect to 100 parts by mass of the polymer component, a sulfurous antioxidant that is a benzimidazole compound, the sulfurous antioxidant content being 0.5 to 9.5 parts by mass with respect to 100 parts by mass of the polymer component, a zinc oxide, the zinc oxide content being 0.5 to 9.5 parts by mass with respect to 100 parts by mass of the polymer component, and a copper inhibitor, the copper inhibitor content being 0.1 to 4.7 parts by mass with respect to 100 parts by mass of the polymer component.

It is preferable that the silane-crosslinked polyolefin is polyethylene having a density of 0.880 to 0.910 g/cm$^3$ that is silane-crosslinked. In addition, it is preferable that the polyolefin is polyethylene having a density of 0.880 to 0.910 g/cm$^3$, and/or an olefin elastomer having a melting point of 140° C. or more.

In another aspect of the present invention, an insulated wire according to a preferred embodiment of the present invention includes the flame-retardant composition described above, and a conductor which is covered with the composition.

Yet, in another aspect of the present invention, a method for producing a flame-retardant composition according to a preferred embodiment of the present invention includes the steps of kneading a component A that includes silane-modified polyolefin prepared by graft polymerization of polyolefin with a silane coupling agent, a component B that includes polyolefin, a metallic hydrate that is magnesium hydroxide and/or aluminum hydroxide, a phenolic antioxidant, a sulfurous antioxidant that is a benzimidazole compound, a zinc oxide, and a copper inhibitor, and a component C that includes polyolefin and a silane crosslinking catalyst, into a composition, molding the kneaded composition, and water-crosslinking the molded composition.

Advantageous Effects of Invention

Since the flame-retardant composition according to the preferred embodiment of the present invention contains the silane-crosslinked polyolefin as a base resin, the polyolefin, the magnesium hydroxide and/or the aluminum hydroxide, the phenolic antioxidant, the sulfurous antioxidant that is preferably a benzimidazole compound, the zinc oxide, and the copper inhibitor while the contents of the components are specified as above, the flame-retardant composition is more excellent in heat resistance than a conventional flame-retardant composition. Since the benzimidazole compound is used as the sulfurous antioxidant, and the zinc oxide is used as a metallic oxide, the flame-retardant composition is excellent especially in heat resistance. Thus, the flame-retardant composition can acquire heat resistance at 150° C. or more according to the ISO standard.

If the silane-crosslinked polyolefin and the polyolefin are specified as described above, the flame-retardant composition is excellent both in flexibility and oil resistance. Thus, when the flame-retardant composition is used as a covering material of an insulated wire, wiring of the insulated wire can be carried out easily, and the insulated wire can be used suitably in a location apt to be exposed to gasoline such as an engine room of an automobile.

Meanwhile, since the insulated wire according to the preferred embodiment of the present invention includes the flame-retardant composition and the conductor which is covered with the composition, the insulated wire is excellent in heat resistance.

Meanwhile, according to the method for producing a flame-retardant composition according to the preferred embodiment of the present invention, the produced flame-retardant composition is excellent in heat resistance.

DESCRIPTION OF EMBODIMENTS

A detailed description of preferred embodiments of the present invention will now be provided. A flame-retardant composition according to one of the preferred embodiments of the present invention contains silane-crosslinked polyolefin, polyolefin, a metallic hydrate, a phenolic antioxidant, a sulfurous antioxidant, a metallic oxide, and a copper inhibitor.

The silane-crosslinked polyolefin is a main component of the flame-retardant composition according to the preferred embodiment of the present invention, which is prepared by silane-crosslinking silane-modified polyolefin. It is preferable to silane-crosslink the silane-modified polyolefin after the flame-retardant composition is molded. In view of improving heat resistance of the flame-retardant composition, the silane-crosslinked polyolefin has a gel content of preferably 50% or more, and more preferably 60% or more. It is to be noted that the gel content is a generally used indicator of a crosslinking state of a crosslinked wire, for example. The gel content of an automotive crosslinked wire can be measured preferably based on JASO-D608-92.

Polyolefin from which the silane-modified polyolefin is made is not limited specifically. Examples of the polyolefin include a homopolymer of olefin such as ethylene and propylene, an ethylene copolymer such as an ethylene-alpha-olefin copolymer, an ethylene-vinyl acetate copolymer and an ethylene-(meth)acrylic ester copolymer, and a propylene copolymer such as a propylene-alpha-olefin copolymer, a propylene-vinyl acetate copolymer and a propylene-(meth) acrylic ester copolymer. They may be used singly or in combination.

Among them, the polyethylene, the polypropylene, the ethylene-vinyl acetate copolymer, the ethylene-acrylic ester copolymer and the ethylene-methacrylic ester copolymer are preferably used.

Examples of the polyethylene include high density polyethylene (HDPE), middle density polyethylene (MDPE), low density polyethylene (LDPE), linear low density polyethylene (LLDPE), ultra low density polyethylene, and metallocene ultralow density polyethylene. They may be used singly or in combination. Among them, the metallocene ultralow density polyethylene is preferably used.

In view of improving flexibility of the flame-retardant composition, the polyolefin from which the silane-modified polyolefin is made preferably has a density of 0.910 g/cm$^3$ or less; however, the degree of crystallization of the polyolefin decreases as its density decreases, so that the polyolefin from which the silane-modified polyolefin is made preferably has a density of 0.880 g/cm$^3$ or more in view of preventing the silane-grafted resin from swelling with gasoline (oil) and improving gasoline resistance of the flame-retardant composition. Thus, the polyolefin from which the silane-modified polyolefin is made has the density of preferably 0.880 to 0.910 g/cm$^3$. More preferably used as the polyolefin is polyethylene having a density of 0.880 to 0.910 g/cm$^3$.

The polyolefin contained in the flame-retardant composition together with the silane-crosslinked polyolefin is not limited specifically. Examples of the polyolefin include polyolefin of the same kind as the polyolefin from which the silane-modified polyolefin is made. They may be used singly or in combination.

In view of improving flexibility and gasoline resistance of the flame-retardant composition, the polyolefin preferably has a density of 0.880 to 0.910 g/cm$^3$. Considering compatibility, the polyolefin of the same kind as the polyolefin from which the silane-modified polyolefin is made is preferably used as the polyolefin. If an olefin elastomer having a melting point of 140° C. or more is used as the polyolefin, the flame-retardant composition easily improves in gasoline resistance. Examples of the olefin elastomer include an ethylene elastomer and a propylene elastomer. In view of improving gasoline resistance of the flame-retardant composition, the polypropylene elastomer is preferably used as the olefin elastomer.

The content of the polyolefin contained in the flame-retardant composition together with the silane-crosslinked polyolefin is preferably 32 to 157 parts by mass with respect to 100 parts by mass of the silane-crosslinked polyolefin.

Examples of the metallic hydrate include a magnesium hydroxide, an aluminum hydroxide, a calcium hydroxide, a zirconium hydroxide and a barium hydroxide. Among them, the magnesium hydroxide and the aluminum hydroxide are preferably used. In order to improve compatibility with the resin that is the main component, the metallic hydrate may be subjected to surface finishing with the use of a finishing agent such as a silane coupling agent, a fatty acid and wax.

The content of the metallic hydrate cannot be specified clearly until the type of the metallic hydrate, the size of a wire, and the structure of a conductor and an insulator are taken into consideration; however, if the content is set to be 28 to 190 parts by mass with respect to 100 parts by mass of a polymer component that contains the silane-crosslinked polyolefin as a main component, the flame-retardant composition can easily acquire flame retardancy sufficient to meet a requirement for an automotive wire, for example. The content is preferably 70 to 150 parts by mass. If the content is less than 28 parts by mass, the flame-retardant composition is liable to lack in flame retardancy. On the other hand, if the content is more than 190 parts by mass, the flame-retardant composition is liable to decrease in extrusion moldability.

In addition to the silane-crosslinked polyolefin, the polyolefin and the metallic hydrate, the flame-retardant composition according to the preferred embodiment of the present invention contains the phenolic antioxidant, the sulfurous antioxidant, the metallic oxide and the copper inhibitor. The combined use of the phenolic antioxidant, the sulfurous antioxidant, the metallic oxide and the copper inhibitor with the silane-crosslinked polyolefin allows the flame-retardant composition to acquire excellent heat resistance more than ever before.

Meanwhile, in conventional flame-retardant compositions, a phenolic antioxidant, a sulfurous antioxidant and a phosphorus antioxidant are often used singly or in combination; however, the flame-retardant compositions containing only the phenolic antioxidant has an allowable temperature limit of at most 120° C. according to the ISO standard, and even the combined use of the sulfurous antioxidant or the phosphorus antioxidant with the phenolic antioxidant does not contribute to improvement in heat resistance of the flame-retardant compositions.

In the present invention, it is assumed that when the flame-retardant composition is used as an insulator that covers a conductor in an insulated wire, the sulfur atoms form a supplemental crosslinking bond in the silane-crosslinked polyolefin during the progression of heat deterioration, which prevents heat deterioration of the silane-crosslinked polyolefin. It is also assumed that the metallic hydrate acts as a catalyst for promoting the crosslinking bond, and that the copper inhibitor captures copper ions that are generated from the conductor (copper wire) in the insulated wire, which prevents the copper from acting as a catalyst to cause heat deterioration to the insulator. Thus, the flame-retardant composition according to the preferred embodiment of the present invention can achieve action and effect unique to the present invention, that is, acquirement of excellent heat resistance more than ever before.

In the present invention, since the flame-retardant composition according to the preferred embodiment of the present invention contains the phenolic antioxidant, the flame-retardant composition can acquire excellent heat resistance also against heat deterioration that is caused by a mechanism different from the mechanism causing heat deterioration that is intended to be prevented by the sulfurous antioxidant.

Examples of the phenolic antioxidant include tetrakis [methylene-3-(3,5-di-t-butyl-4-hydroxyphenyl) propionate] methane.

The content of the phenolic antioxidant is preferably 0.5 to 9.5 parts by mass and more preferably 0.9 to 6 parts by mass with respect to 100 parts by mass of the polymer component. If the content is less than 0.5 parts by mass, the flame-retardant composition is liable to lack the effect of improving heat resistance. On the other hand, if the content is more than 9.5 parts by mass, the antioxidant easily blooms especially under a high-temperature and high-humidity atmosphere.

Examples of the sulfurous antioxidant include a benzimidazole compound, an organic thioacid compound, a dithiocarbamate compound and a thiourea compound. Among them, the benzimidazole compound is preferably used in view of increasing the effect of improving heat resistance of the flame-retardant composition.

Examples of the benzimidazole compound include 2-mercaptobenzimidazole, 2-mercaptomethylbenzimidazole, 4-mercaptomethylbenzimidazole and 5-mercaptomethylbenzimidazole, and zinc salt thereof. Among them, the 2-mercaptobenzimidazole and the zinc salt thereof are preferably used. The benzimidazole compounds described above may have a substituent such as an alkyl group at positions of benzimidazole skeletons thereof where the mercapto groups are not bonded.

The content of the sulfurous antioxidant is preferably 0.5 to 9.5 parts by mass and more preferably 0.9 to 6 parts by mass with respect to 100 parts by mass of the polymer component. If the content is less than 0.5 parts by mass, the flame-retardant composition is liable to lack the effect of improving heat resistance. On the other hand, if the content is more than 9.5 parts by mass, the antioxidant easily blooms especially under a high-temperature and high-humidity atmosphere.

Examples of the metallic oxide include a zinc oxide, an aluminum oxide, a potassium oxide, a calcium oxide, a barium oxide and a magnesium oxide. Among them, the zinc oxide is more preferably used in view of increasing the effect of improving heat resistance of the flame-retardant composition especially when used in combination with the 2-mercaptobenzimidazole.

The content of the metallic oxide is preferably 0.5 to 9.5 parts by mass and more preferably 0.9 to 6 parts by mass with respect to 100 parts by mass of the polymer component. If the content is less than 0.5 parts by mass, the flame-retardant composition is liable to lack the effect of improving heat resistance. On the other hand, if the content is more than 9.5 parts by mass, a sufficient mechanical property is not provided to the flame-retardant composition.

Examples of the copper inhibitor include a triazole compound. Examples of the triazole compound include heavy metal deactivators of ADK STAB CDA-SERIES, manufactured by ADEKA CORPORATION, and specific examples of the heavy metal deactivators include ADK STAB CDA-1, ADK STAB CDA-6 and ADK STAB CDA-10. Among them, the ADK STAB CDA-6 (decamethylenecarboxylic acid disalicyloyl hydrazide) is preferably used.

The content of the copper inhibitor is preferably 0.1 to 4.7 parts by mass and more preferably 0.3 to 3 parts by mass with respect to 100 parts by mass of the polymer component. If the content is less than 0.1 parts by mass, the flame-retardant composition is liable to lack the effect of improving heat resistance. On the other hand, if the content is more than 4.7 parts by mass, the copper inhibitor easily blooms especially under a high-temperature and high-humidity atmosphere while the effect of improving heat resistance is saturated, and an increase in cost is caused.

It is preferable that the flame-retardant composition according to the preferred embodiment of the present invention further contains an additive as appropriate within a range of not impairing the properties of the flame-retardant composition. Examples of the additive include an ultraviolet absorber, a processing aid (e.g., wax, lubricant), a flame-retardant auxiliary agent and a coloring agent.

The flame-retardant composition according to the preferred embodiment of the present invention can be prepared by kneading the silane-modified polyolefin, the polyolefin, the metallic hydrate, the phenolic antioxidant, the sulfurous antioxidant, the metallic oxide, the copper inhibitor and a silane crosslinking catalyst into a composition with the use of a generally used kneader such as a Banbury mixer, a pressure kneader, a kneading extruder, a twin screw extruder and a roll, molding the kneaded composition, and then silane-crosslinking (water-crosslinking) the silane-modified polyolefin after the molding of the composition. The contents of the components are adjusted preferably as appropriate within the respective ranges described above.

Examples of the silane crosslinking catalyst include a metal carboxylate containing a metal such as tin, zinc, iron, lead, cobalt, barium and calcium, a titanate ester, an organic base, an inorganic acid, and an organic acid. Specific examples of the silane crosslinking catalyst include dibutyltin dilaurate, dibutyltin dimalate, dibutyltin mercaptide (e.g., dibutyltin bis-octylthioglycolate, a dibutyltin beta-mercaptopropionate polymer), dibutyltin diacetate, dioctyltin dilaurate, tin acetate, tin caprylate, lead naphthenate, cobalt naphthenate, barium stearate, calcium stearate, tetrabutyl titanate, tetranonyl titanate, dibutylamine, hexylamine, pyridine, a sulfuric acid, a hydrochloric acid, a toluenesulfonic acid, an acetate, a stearic acid, and a maleic acid. Among them, the dibutyltin dilaurate, the dibutyltin dimalate, and the dibutyltin mercaptide are preferably used.

The content of the crosslinking catalyst is preferably more than 0.001 and less than 0.579 parts by mass and more preferably 0.003 to 0.334 parts by mass with respect to 100 parts by mass of the silane-modified polyolefin. If the content is 0.001 parts by mass or less, the silane-crosslinked polyolefin is liable to have an insufficient crosslinking degree. On the other hand, if the content is 0.579 parts by mass or more, a molded product of the composition is liable to have marred surface appearance.

The silane-modified polyolefin can be prepared preferably by graft reaction of polyolefin with a silane crosslinking agent such as a silane coupling agent with the use of a radical generating agent such as an organic peroxide. In the preferred embodiment of the present invention, the silane-modified polyolefin is prepared in advance, and the prepared silane-modified polyolefin is brought into contact with the metallic hydrate. This is because if the polyolefin, the silane coupling agent and the metallic hydrate are kneaded together at a time, water contained in the metallic hydrate reacts with the silane coupling agent to hinder the graft reaction of the polyolefin with the silane coupling agent, which generates a gel-like material on a surface of a molded product of the composition to cause marred surface appearance, alternatively, which causes insufficient crosslinking in the silane-crosslinked polyolefin, lowering heat resistance of the flame-retardant composition. By preparing the silane-modified polyolefin in advance and bringing the prepared silane-modified polyolefin into contact with the metallic hydrate, the silane-modified polyolefin can be silane-crosslinked to a high degree (e.g., the silane-crosslinked polyolefin has a gel content of 50% or more, and preferably 60% or more).

Examples of the silane coupling agent include vinylalkoxysilane such as vinyltrimethoxysilane, vinyltriethoxysilane and vinyltributoxysilane, n-hexyl trimethoxysilane, vinylacetoxysilane, γ-methacryloxypropyltrimethoxysilane, and γ-methacryloxypropylmethyldimethoxysilane. They may be used singly or in combination.

The content of the silane coupling agent is preferably more than 0.1 parts by mass and less than 10 parts by mass and more preferably 0.5 to 5 parts by mass with respect to 100 parts by mass of the polyolefin to be silane-modified. If the content is 0.1 parts by mass or less, the silane-crosslinked polyolefin is liable to have an insufficient crosslinking degree. On the other hand, if the content is 10 parts by mass or more, a molded product of the composition is liable to have marred surface appearance.

Examples of the radical generating agent include dicumyl peroxide (DCP), benzoyl peroxide, dichlorobenzoyl peroxide, di-tert-butyl peroxide, butyl peracetate, tert-butyl perbenzoate, and 2,5-dimethyl-2,5-d (tert-butyl peroxy)hexane. Among them, the dicumyl peroxide (DCP) is preferably used.

The content of the radical generating agent is preferably more than 0.01 and less than 0.3 parts by mass and more preferably 0.025 to 0.1 parts by mass with respect to 100 parts by mass of the polyolefin to be silane-modified. If the content is 0.01 parts by mass or less, the silane-crosslinked polyolefin is liable to have an insufficient crosslinking degree. On the other hand, if the content is 0.3 parts by mass or more, crosslinking of the peroxide unintentionally proceeds, and a molded product of the composition is liable to have marred surface appearance.

In addition, in the preferred embodiment of the present invention, it is preferable that a component A containing the silane-modified polyolefin, a component B containing additives including the metallic hydrate, the antioxidant, the metallic oxide and the copper inhibitor, and a component C containing the silane crosslinking catalyst are prepared and left separate until immediately before the molding. In the preparation of the component containing the additives and the component containing the silane crosslinking catalyst, it is preferable to add additives in advance to polymer components such as polyolefin contained in those components in order that the kneading with the component containing the silane-modified polyolefin may be performed easily. Examples of the polymer components include the polyolefin described above.

The mixing ratio between the component A and the component B:A/B is preferably 10/90 to 60/40 in mass ratio. If the component B is less than 40% by mass, the flame-retardant composition is liable to lack in flame retardancy. On the other hand, if the component A is less than 10% by mass, the component to be crosslinked is small in amount and the silane-crosslinked polyolefin is liable to have an insufficient crosslinking degree. Because of the insufficient crosslinking degree of the silane-crosslinked polyolefin, the flame-retardant composition is liable to decrease in heat resistance. In addition, the flame-retardant composition is liable to swell with gasoline, and thus liable to decrease in gasoline resistance.

The content of the component C is preferably more than 1 part by mass and less than 14.3 parts by mass and more preferably 3 to 10 parts by mass with respect to 100 parts by mass of the silane-modified polyolefin. If the content is 1 part by mass or less, the silane crosslinking catalyst is small in amount, and the silane-crosslinked polyolefin is liable to have a small crosslinking degree. On the other hand, if the content is 14.3 parts by mass or more, the silane crosslinking catalyst is redundant, and a molded product of the flame-retardant composition is liable to have marred surface appearance because of the redundancy.

For example, in producing a covering material of an insulated wire from the flame-retardant composition, it is preferable that the kneaded composition of the components A, B and C is extrusion molded around a conductor made of copper, a copper alloy, aluminum or an aluminum alloy, and then the composition is silane-crosslinked (water-crosslinked).

Next, a description of an insulated wire according to another preferred embodiment of the present invention will be provided. The insulated wire according to the preferred embodiment of the present invention includes the flame-retardant composition described above and a conductor covered with the composition. The diameter, the material and other properties of the conductor are not specifically limited and may be determined depending on the intended use. In addition, the thickness of the insulated covering material is not specifically limited and may be determined considering the conductor diameter.

The production of the insulated wire according to the preferred embodiment of the present invention preferably includes the steps of heat-kneading the components A, B and C described above into a composition, extrusion-covering the conductor with the heat-kneaded composition, and then silane-crosslinking (water-crosslinking) the covering composition.

EXAMPLE

A description of the present invention will now be specifically provided with reference to examples. However, the present invention is not limited thereto.

(Material Used Manufacturer, and Other Information)

Materials used in the examples and comparative examples are provided below along with their manufacturers, trade names, and other information.

Polyethylene (1) [manuf.: DUPONT DOW ELASTOMERS JAPAN KK, trade name: ENGAGE 8003, density=0.885 g/cm$^3$]
Polyethylene (2) [manuf.: DUPONT DOW ELASTOMERS JAPAN KK, trade name: ENGAGE 8450, density=0.902 g/cm$^3$]
Polyethylene (3) [manuf.: DUPONT DOW ELASTOMERS JAPAN KK, trade name: ENGAGE 8540, density=0.908 g/cm$^3$]
Polyethylene (4) [manuf.: DUPONT DOW ELASTOMERS JAPAN KK, trade name: ENGAGE 8452, density=0.875 g/cm$^3$]
Polyethylene (5) [manuf.: NIPPON UNICAR COMPANY LIMITED, trade name: DFDJ 7540, density 0.920 g/cm$^3$]
Polypropylene elastomer (PP elastomer) [manuf.: JAPAN POLYPROPYLENE CORPORATION, trade name: NEWCON NAR6, density=0.89 g/cm$^3$]
Magnesium hydroxide [manuf.: KYOWA CHEMICAL INDUSTRY CO., LTD., trade name: KISUMA 5]
Silane coupling agent [manuf.: DOW CORNING TORAY CO., LTD., trade name: SZ6300]
Dicumyl peroxide (DCP) [manuf.: NOF CORPORATION, trade name: PERCUMYL D]
Silane crosslinking catalyst (dibutyltin dilaurate) [manuf.: ADEKA CORPORATION, trade name: MARK BT-1]
Phenolic antioxidant [Manuf.: CIBA SPECIALTY CHEMICALS INC., trade name: "IRGANOX 1010"]
Sulfurous antioxidant [Manuf.: OUCHI SHINKO CHEMICAL INDUSTRIAL CO., LTD., trade name: "NOCRAC MB"]
Zinc oxide [Manuf.: HAKUSUITECH CO., LTD., trade name: "ZINC OXIDE JIS1"]
Copper inhibitor [Manuf.: ADEKA CORPORATION, trade name: CDA-1]

<Preliminary Study 1>

First of all, preliminary studies on the polyolefins were conducted in terms of their kinds. To be specific, conducted were studies as to effects of performances of the polyolefins having the different densities when used as covering materials of insulated wires (see Reference Examples 1 to 5 in Table 1).

(Preparation of Silane-Grafted Polyethylene-Containing Batch)

Five kinds of silane-grafted polyethylene-containing batches (components A) according to reference examples were prepared as follows: 70 parts by mass of any one of polyethylenes (1) to (5), 0.35 parts by mass of the silane coupling agent, and 0.07 parts by mass of the peroxide (dicumyl peroxide) were charged into a twin screw kneading extruder and heat-kneaded at 200° C. for 0.1 to 2 minutes, and then the kneaded composition was formed into a pellet.

(Preparation of Flame Retardant-Containing Batch)

A flame retardant-containing batch (component B) was prepared as follows: 20 parts by mass of polyethylene (1), 10 parts by mass of the PP elastomer, 100 parts by mass of the magnesium hydroxide, 3 parts by mass of the phenolic antioxidant, 5 parts by mass of the sulfurous antioxidant, 5 parts by mass of the zinc oxide, and 1 part by mass of the copper inhibitor were charged into a twin screw kneading extruder and heat-kneaded at 200° C. for 0.1 to 2 minutes, and then the kneaded composition was formed into a pellet.

(Preparation of Catalyst-Containing Batch)

A catalyst-containing batch (component C) was prepared as follows: 5 parts by mass of polyethylene (1) and 0.05 parts by mass of the silane crosslinking catalyst were charged into a twin screw kneading extruder and were heat-kneaded at 200° C. for 0.1 to 2 minutes, and then the kneaded composition was formed into a pellet.

(Preparation of Insulated Wire)

Five kinds of insulated wires were prepared as follows: any one of the silane-grafted polyethylene-containing batches, the flame retardant-containing batch, and the catalyst-containing batch were kneaded by using a hopper of an extruder at about 180° C. to 200° C., and subjected to extrusion processing. Conductors having an external diameter of 2.4 mm were extrusion-covered with thus-prepared compositions of the kneaded batches that were insulators having a thickness of 0.7 mm (i.e., the external diameter of the insulated wires after the extrusion-covering was 3.8 mm). Then, the compositions were water-crosslinked in a bath at a high humidity of 90% and at a high temperature of 60° C. for 24 hours.

(Evaluation of Flexibility)

The evaluations of the insulated wires were made in terms of flexibility by the touch when bending the insulated wires by hands. To be more specific, the insulated wires that had a good feel were regarded as good.

(Evaluation of Gasoline Resistance)

The evaluations of the insulated wires were made in terms of gasoline resistance in accordance with ISO6722-11-1. To be specific, the insulated wires were each immersed in ISO1817 gasoline (a liquid C) at 23±5° C. for 20 hours, removed from the gasoline to wipe the gasoline off their surfaces, dried at room temperature for 30 minutes, and measured for external diameter within 5 minutes after the drying step. The insulated wires that had the rate of change of the external diameter of 15% or less were regarded as good, the rate of change being calculated by the following expression (Expression 1). In addition, the insulated wires were each wound around a stipulated mandrel and checked for cracking.

(Expression 1)

Rate of change=(External diameter before immersion−External diameter after immersion)/(External diameter before immersion)×100(%)

TABLE 1

| | | Kind | Density g/cm$^3$ | MFR (g/10 min) | Flexibility | Gasoline Resistance |
|---|---|---|---|---|---|---|
| Reference Example | 1 | Polyethylene (1) | 0.885 | 1 | Good | Good |
| | 2 | Polyethylene (2) | 0.902 | 3 | Good | Good |
| | 3 | Polyethylene (3) | 0.908 | 1 | Good | Good |
| | 4 | Polyethylene (4) | 0.875 | 3 | Good | Bad |
| | 5 | Polyethylene (5) | 0.920 | 0.6 | Bad | Good |

According to Table 1, it is shown that the polyolefins (polyethylenes) having a density of 0.880 to 0.910 g/cm$^3$ are excellent in flexibility and gasoline resistance.

<Preliminary Study 2>

Next, preliminary studies on producing conditions of silane-crosslinked polyolefins were conducted. The evaluations of the conditions were conducted by measuring gel contents of the silane-crosslinked polyolefins and by evaluating surface appearance of the silane-crosslinked polyolefins after extrusion.

(Preparation of Silane-Grafted Polyethylene-Containing Batch)

Silane-grafted polyethylene-containing batches (components A) according to reference examples were prepared as follows: the ingredients of each component A at the mass ratio shown in Table 2 were charged into a twin screw kneading extruder and heat-kneaded at 200° C. for 0.1 to 2 minutes, and then the kneaded composition was formed into a pellet.

(Preparation of Flame Retardant-Containing Batch)

Flame retardant-containing batches (components B) according to the reference examples were prepared as follows: the ingredients of each component B at the mass ratio shown in Table 2 were charged into a twin screw kneading extruder and heat-kneaded at 200° C. for 0.1 to 2 minutes, and then the kneaded composition was formed into a pellet.

(Preparation of Catalyst-Containing Batch)

Catalyst-containing batches (components C) according to the reference examples were prepared as follows: the ingredients of each component C at the mass ratio shown in Table 2 were charged into a twin screw kneading extruder and heat-kneaded at 200° C. for 0.1 to 2 minutes, and then the kneaded composition was formed into a pellet.

(Preparation of Insulated Wire)

Insulated wires were each prepared as follows: the silane-grafted polyethylene-containing batch (component A), the flame retardant-containing batch (component B), and the catalyst-containing batch (component C) having the respective mass ratios shown in Table 2 were kneaded by using a hopper of an extruder at about 180° C. to 200° C., and subjected to extrusion processing. Conductors having an external diameter of 2.4 mm were extrusion-covered with thus-prepared compositions of the kneaded batches that were insulators having a thickness of 0.7 mm (i.e., the external diameter of the insulated wires after the extrusion-covering was 3.8 mm). Then, the compositions were water-crosslinked in a bath at a high humidity of 90% and at a high temperature of 60° C. for 24 hours.

(Measurement Method of Gel Content)

The gel contents of the water-crosslinked compositions were measured in accordance with JASO-D608-92. To be specific, about 0.1 g of test samples of the insulators of the insulated wires were each weighed out and put in a test tube, to which 20 ml xylene was added, and then, the test samples were each heated in a constant temperature oil bath at 120° C. for 24 hours. Then, the test samples were each taken out from the test tube to be dried in a dryer at 100° C. for 6 hours. The dried test samples were each cooled to a room temperature and precisely weighed. The percentages of the masses of the test samples after the test to the masses of the test samples before the test were defined as the gel contents. The test samples having a gel content of 60% or more were regarded as excellent, the test samples having a gel content of 50% or more were regarded as good, and the test samples having a gel content less than 50% were regarded as bad. The gel content is a generally used index of a water crosslinking state of a crosslinked wire. The standard of the gel content is 50% or more.

(Evaluation of Surface Appearance After Extrusion)

Molded products of the compositions having a smooth surface were regarded as excellent, molded products of the compositions having no surface asperities were regarded as good, and molded products of the compositions having surface asperities were regarded as bad.

TABLE 2

| | | Reference Example | | | | | | | |
|---|---|---|---|---|---|---|---|---|---|
| | | 6 | 7 | 8 | 9 | 10 | 11 | 12 | 13 |
| Component A | Polyethylene(1) | 70 | 70 | 70 | 70 | 70 | 70 | 70 | 70 |
| | Silane coupling agent | — | 0.07 | 0.35 | 3.5 | 7 | 0.35 | 0.35 | 0.35 |
| | DCP | 0.07 | 0.07 | 0.07 | 0.07 | 0.07 | — | 0.007 | 0.0175 |
| | Subtotal | 70.07 | 70.14 | 70.42 | 73.57 | 77.07 | 70.35 | 70.36 | 70.37 |
| Component B | Polyethylene(1) | 20 | 20 | 20 | 20 | 20 | 20 | 20 | 20 |
| | PP elastomer | 10 | 10 | 10 | 10 | 10 | 10 | 10 | 10 |
| | Magnesium hydroxide | 100 | 100 | 100 | 100 | 100 | 100 | 100 | 100 |
| | Phenolic antioxidant | 3 | 3 | 3 | 3 | 3 | 3 | 3 | 3 |
| | Sulfurous antioxidant | 5 | 5 | 5 | 5 | 5 | 5 | 5 | 5 |
| | Zinc oxide | 5 | 5 | 5 | 5 | 5 | 5 | 5 | 5 |
| | Copper inhibitor | 1 | 1 | 1 | 1 | 1 | 1 | 1 | 1 |
| | Subtotal | 144 | 144 | 144 | 144 | 144 | 144 | 144 | 144 |
| Component C | Polyethylene(1) | 5 | 5 | 5 | 5 | 5 | 5 | 5 | 5 |
| | Silane crosslinking catalyst | 0.05 | 0.05 | 0.05 | 0.05 | 0.05 | 0.05 | 0.05 | 0.05 |
| | Subtotal | 5.05 | 5.05 | 5.05 | 5.05 | 5.05 | 5.05 | 5.05 | 5.05 |

TABLE 2-continued

| Evaluation | Surface appearance after extrusion | Good | Good | Excellent | Excellent | Good | Good | Good | Excellent |
|---|---|---|---|---|---|---|---|---|---|
| | Gel content | Bad | Good | Excellent | Excellent | Excellent | Bad | Good | Excellent |

| | | Reference Example | | | | | | |
|---|---|---|---|---|---|---|---|---|
| | | 14 | 15 | 16 | 17 | 18 | 19 | 20 |
| Component A | Polyethylene(1) | 70 | 70 | 70 | 70 | 70 | 70 | 70 |
| | Silane coupling agent | 0.35 | 0.35 | 0.35 | 0.35 | 0.35 | 0.35 | 0.35 |
| | DCP | 0.07 | 0.23 | 0.07 | 0.07 | 0.07 | 0.07 | 0.07 |
| | Subtotal | 70.42 | 70.58 | 70.42 | 70.42 | 70.42 | 70.42 | 70.42 |
| Component B | Polyethylene(1) | 20 | 20 | 20 | 20 | 20 | 20 | 20 |
| | PP elastomer | 10 | 10 | 10 | 10 | 10 | 10 | 10 |
| | Magnesium hydroxide | 100 | 100 | 100 | 100 | 100 | 100 | 100 |
| | Phenolic antioxidant | 3 | 3 | 3 | 3 | 3 | 3 | 3 |
| | Sulfurous antioxidant | 5 | 5 | 5 | 5 | 5 | 5 | 5 |
| | Zinc oxide | 5 | 5 | 5 | 5 | 5 | 5 | 5 |
| | Copper inhibitor | 1 | 1 | 1 | 1 | 1 | 1 | 1 |
| | Subtotal | 144 | 144 | 144 | 144 | 144 | 144 | 144 |
| Component C | Polyethylene(1) | 5 | 5 | 5 | 5 | 5 | 5 | 5 |
| | Silane crosslinking catalyst | 0.05 | 0.05 | — | 0.001 | 0.002 | 0.235 | 0.407 |
| | Subtotal | 5.05 | 5.05 | 5.00 | 5.00 | 5.00 | 5.24 | 5.41 |
| Evaluation | Surface appearance after extrusion | Excellent | Good | Good | Good | Excellent | Excellent | Good |
| | Gel content | Excellent | Excellent | Bad | Good | Excellent | Excellent | Excellent |

According to Table 2, it is shown that when the components A contain 0.5 parts by mass or more of the silane coupling agent (see Reference Examples 8 to 10) and 0.025 parts by mass or more of the peroxide (see Reference Examples 13 to 15) with respect to 100 parts by mass of the polyethylene, the compositions have a gel content of 60% or more. It is thus shown that these insulated wires include more excellent covering materials having a higher crosslinking degree. Meanwhile, it is shown that when the components A contain 5 parts by mass or less of the silane coupling agent (see Reference Examples 7 to 9) and 0.1 parts by mass or less of the peroxide (see Reference Examples 12 to 14) with respect to 100 parts by mass of the polyethylene, the covering materials hardly have surface asperities, and thus have excellent surface appearance. As a consequence, it is found that the silane coupling agent content is more preferably 0.5 to 5 parts by mass, and the peroxide content is more preferably 0.025 to 0.1 parts by mass (see Reference Examples 6 to 15).

In addition, it is shown that when 0.003 parts by mass or more of the silane crosslinking catalysts are contained with respect to 100 parts by mass of the silane-grafted polyethylenes of the components A, the insulated wires have a gel content of 60% or more. It is thus shown that these insulated wires include more excellent covering materials having a higher crosslinking degree (see Reference Examples 16 to 20).

EXAMPLE AND COMPARATIVE EXAMPLE

Preparation of Silane-Grafted Polyethylene-Containing Batch

A silane-grafted polyethylene-containing batch (component A) according to present examples and comparative examples was prepared as follows: 70 parts by mass of polyethylene (1), 0.35 parts by mass of the silane coupling agent, and 0.07 parts by mass of the peroxide (dicumyl peroxide) were charged into a twin screw kneading extruder and heat-kneaded at 200° C. for 0.1 to 2 minutes, and then the kneaded composition was formed into a pellet.

(Preparation of Flame Retardant-Containing Batch)

Flame retardant-containing batches (components B) according to the present examples and comparative examples were prepared as follows: the ingredients of each component B at the mass ratio shown in Tables 3 to 5 were charged into a twin screw kneading extruder and heat-kneaded at 200° C. for 0.1 to 2 minutes, and then the kneaded composition was formed into a pellet.

(Preparation of Catalyst-Containing Batch)

A catalyst-containing batch (component C) according to the present examples and comparative examples was prepared as follows: 5 parts by mass of polyethylene (1), and 0.05 parts by mass of the silane crosslinking catalyst were charged into a twin screw kneading extruder and heat-kneaded at 200° C. for 0.1 to 2 minutes, and then the kneaded composition was formed into a pellet.

(Preparation of Insulated Wire)

Insulated wires were each prepared as follows: the silane-grafted polyethylene-containing batch (component A), the flame retardant-containing batch (component B), and the catalyst-containing batch (component C) having the respective mass ratios shown in Tables 3 to 5 were kneaded by using a hopper of an extruder at about 180° C. to 200° C., and subjected to extrusion processing. Conductors having an external diameter of 2.4 mm were extrusion-covered with thus-prepared compositions of the kneaded batches that were insulators having a thickness of 0.7 mm (i.e., the external diameter of the insulated wires after the extrusion-covering was 3.8 mm). Then, the compositions were water-crosslinked in a bath at a high humidity of 90% and at a high temperature of 60° C. for 24 hours.

Evaluations of the obtained insulated wires were made in terms of flame retardancy and heat resistance in accordance with the following methods. In addition, evaluations of the obtained insulated wires were made in terms of product properties (evaluations in terms of surface appearance after extrusion, and mechanical properties) in accordance with the following methods. The results are shown in Tables 3 to 5.

(Flame Retardancy)

A horizontal firing test was performed based on JASO D608-92. To be specific, the insulated wires according to the present examples and comparative examples were cut into test specimens 300 mm long, and a center portion of each test specimen was subjected to the tip of a reducing flame from beneath within 10 seconds by using a Bunsen burner having a caliber of 10 mm, and then, after the flame was calmly removed, an afterflame time of each test specimen was measured. The test specimens whose flames died down immediately were regarded as excellent, the test specimen whose afterflame time was within 30 seconds was regarded as good, and the test specimen whose afterflame time was over 30 seconds was regarded as bad.

(Heat Resistance)

A heat resistance test was performed based on ISO 6722:2006(F) 10.1. To be specific, the insulated wires according to the present examples and comparative examples were cut into test specimens 350 mm long or more. The test specimens were charged into a furnace at 150° C. for 3000 hours. Then, each specimen were wound around a mandrel at room temperature, and checked for cracking in the insulator. The test specimens that were discolored little and have no cracking observed were regarded as excellent, the test specimens that have no cracking observed were regarded as good, and the test specimens that have some cracking observed were regarded as bad.

(Evaluation of Surface Appearance After Extrusion)

Molded products of the compositions having a smooth surface were regarded as excellent, molded products of the compositions having no surface asperities were regarded as good, and molded products of the compositions having surface asperities were regarded as bad.

(Evaluation of Mechanical Properties)

The measurements of tensile strength and tensile elongation of the insulated wires were obtained by a tensile test in accordance with JIS C 3005 To be specific, the insulated wires were, after the conductors were removed therefrom, each cut to a length of 150 mm, and tubular test pieces including only the insulating covering materials were obtained. Then, at a room temperature of 23±5° C., the both ends of each test piece were attached to chucks of a tensile tester and were pulled at a tensile speed of 200 mm/min, and the load and elongation at the times of break of each test piece were measured. The insulated wires having a tensile strength of 11 MPa or more and a tensile elongation of 200% or more were regarded as excellent, the insulated wires having a tensile strength of 10 MPa or more and a tensile elongation of 150% or more were regarded as good, and the insulated wire having a tensile strength of less than 10 MPa or a tensile elongation less than 150% was regarded as bad.

TABLE 3

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Component A | Polyethylene (1) | 70 | 70 | 70 | 70 | 70 | 70 | 70 | 70 | 70 | 70 | 70 | 70 |
| | Silane coupling agent | 0.35 | 0.35 | 0.35 | 0.35 | 0.35 | 0.35 | 0.35 | 0.35 | 0.35 | 0.35 | 0.35 | 0.35 |
| | DCP | 0.07 | 0.07 | 0.07 | 0.07 | 0.07 | 0.07 | 0.07 | 0.07 | 0.07 | 0.07 | 0.07 | 0.07 |
| Component B | Polyethylene (1) | 20 | 20 | 20 | 20 | 20 | 20 | 20 | 20 | 20 | 20 | 20 | 20 |
| | PP elastomer | 10 | 10 | 10 | 10 | 10 | 10 | 10 | 10 | 10 | 10 | 10 | 10 |
| | Magnesium hydroxide | 100 | 100 | 100 | 100 | 100 | 100 | 100 | 100 | 100 | 100 | 100 | 100 |
| | Phenolic antioxidant | 3 | 3 | 3 | 3 | 3 | 3 | 3 | 3 | 3 | 3 | 3 | 3 |
| | Sulfurous antioxidant | 0.5 | 0.9 | 6 | 10 | 5 | 5 | 5 | 5 | 5 | 5 | 5 | 5 |
| | Zinc oxide | 5 | 5 | 5 | 5 | 0.5 | 0.9 | 6 | 10 | 5 | 5 | 5 | 5 |
| | Copper inhibitor | 1 | 1 | 1 | 1 | 1 | 1 | 1 | 1 | 0.1 | 0.3 | 3 | 5 |
| Component C | Polyethylene (1) | 5 | 5 | 5 | 5 | 5 | 5 | 5 | 5 | 5 | 5 | 5 | 5 |
| | Silane crosslinking catalyst | 0.05 | 0.05 | 0.05 | 0.05 | 0.05 | 0.05 | 0.05 | 0.05 | 0.05 | 0.05 | 0.05 | 0.05 |
| Evaluation | Flame retardancy | Excellent | Excellent | Excellent | Excellent | Excellent | Excellent | Excellent | Excellent | Excellent | Excellent | Excellent | Excellent |
| | Heat resistance | Good | Excellent | Excellent | Excellent | Good | Excellent | Excellent | Excellent | Good | Excellent | Excellent | Excellent |
| | Surface appearance after extrusion | Excellent | Excellent | Excellent | Good | Excellent | Excellent | Excellent | Excellent | Excellent | Excellent | Excellent | Good |
| | Mechanical properties | Excellent | Excellent | Excellent | Excellent | Excellent | Excellent | Excellent | Good | Excellent | Excellent | Excellent | Excellent |

TABLE 4

| | | Example | | | | | | | |
|---|---|---|---|---|---|---|---|---|---|
| | | 13 | 14 | 15 | 16 | 17 | 18 | 19 | 20 |
| Component A | Polyethylene(1) | 70 | 70 | 70 | 70 | 70 | 70 | 70 | 70 |
| | Silane coupling agent | 0.35 | 0.35 | 0.35 | 0.35 | 0.35 | 0.35 | 0.35 | 0.35 |
| | DCP | 0.07 | 0.07 | 0.07 | 0.07 | 0.07 | 0.07 | 0.07 | 0.07 |

TABLE 4-continued

|  |  | Example | | | | | | | |
|---|---|---|---|---|---|---|---|---|---|
|  |  | 13 | 14 | 15 | 16 | 17 | 18 | 19 | 20 |
| Component B | Polyethylene(1) | 20 | 20 | 20 | 20 | 20 | 20 | 20 | 20 |
|  | PP elastomer | 10 | 10 | 10 | 10 | 10 | 10 | 10 | 10 |
|  | Magnesium hydroxide | 30 | 70 | 150 | 200 | 100 | 100 | 100 | 100 |
|  | Phenolic antioxidant | 3 | 3 | 3 | 3 | 0.5 | 0.9 | 6 | 10 |
|  | Sulfurous antioxidant | 5 | 5 | 5 | 5 | 5 | 5 | 5 | 5 |
|  | Zinc oxide | 5 | 5 | 5 | 5 | 5 | 5 | 5 | 5 |
|  | Copper inhibitor | 1 | 1 | 1 | 1 | 1 | 1 | 1 | 1 |
| Component C | Polyethylene(1) | 5 | 5 | 5 | 5 | 5 | 5 | 5 | 5 |
|  | Silane crosslinking catalyst | 0.05 | 0.05 | 0.05 | 0.05 | 0.05 | 0.05 | 0.05 | 0.05 |
| Evaluation | Flame retardancy | Good | Excellent | Excellent | Excellent | Excellent | Excellent | Excellent | Excellent |
|  | Heat resistance | Excellent | Excellent | Excellent | Excellent | Good | Excellent | Excellent | Excellent |
|  | Surface appearance after extrusion | Excellent | Excellent | Excellent | Excellent | Excellent | Excellent | Excellent | Good |
|  | Mechanical properties | Excellent | Excellent | Excellent | Good | Excellent | Excellent | Excellent | Excellent |

TABLE 5

|  |  | Comparative Example | | | | |
|---|---|---|---|---|---|---|
|  |  | 1 | 2 | 3 | 4 | 5 |
| Component A | Polyethylene(1) | 70 | 70 | 70 | 70 | 70 |
|  | Silane coupling agent | 0.35 | 0.35 | 0.35 | 0.35 | 0.35 |
|  | DCP | 0.07 | 0.07 | 0.07 | 0.07 | 0.07 |
| Component B | Polyethylene(1) | 20 | 20 | 20 | 20 | 20 |
|  | PP elastomer | 10 | 10 | 10 | 10 | 10 |
|  | Magnesium hydroxide | — | 100 | 100 | 100 | 100 |
|  | Phenolic antioxidant | 3 | — | 3 | 3 | 3 |
|  | Sulfurous antioxidant | 5 | 5 | — | 5 | 5 |
|  | Zinc oxide | 5 | 5 | 5 | — | 5 |
|  | Copper inhibitor | 1 | 1 | 1 | 1 | — |
| Component C | Polyethylene(1) | 5 | 5 | 5 | 5 | 5 |
|  | Silane crosslinking catalyst | 0.05 | 0.05 | 0.05 | 0.05 | 0.05 |
| Evaluation | Flame retardancy | Bad | Excellent | Excellent | Excellent | Excellent |
|  | Heat resistance | Excellent | Bad | Bad | Bad | Bad |
|  | Surface appearance after extrusion | Excellent | Excellent | Excellent | Excellent | Excellent |
|  | Mechanical properties | Excellent | Excellent | Excellent | Excellent | Excellent |

It is shown that the insulated wires according to the comparative examples are inferior in flame retardancy or heat resistance because they do not contain the flame retardant, the phenolic antioxidant, the sulfurous antioxidant, the metallic oxide or the copper inhibitor.

In contrast, it is shown that the insulated wires according to the present examples are excellent in flame retardancy or heat resistance because they contain all of the flame retardant, the phenolic antioxidant, the sulfurous antioxidant, the metallic oxide and the copper inhibitor. In addition, concerning the property evaluations, it is shown that the insulated wires according to the present examples have excellent mechanical properties, and have no problem in product quality concerning the surface appearance after extrusion.

It is shown that the insulated wires according to the present examples are especially excellent in heat resistance, and have excellent surface appearance after extrusion and mechanical properties when 0.9 to 6 parts by mass of the phenolic antioxidant, 0.9 to 6 parts by mass of the sulfurous antioxidant, 0.9 to 6 parts by mass of the zinc oxide, and 0.3 to 3 parts by mass of the copper inhibitor are contained.

Next, studies on the mixing ratio among the silane-grafted polyethylene-containing batch (component A), the flame retardant-containing batch (component B), and the catalyst-containing batch (component C) were conducted.

(Preparation of Silane-Grafted Polyethylene-Containing Batch)

A silane-grafted polyethylene-containing batch (component A) according to reference examples was prepared as follows: 70 parts by mass of polyethylene (1), 0.35 parts by mass of the silane coupling agent, and 0.07 parts by mass of the peroxide (dicumyl peroxide) were charged into a twin screw kneading extruder and heat-kneaded at 200° C. for 0.1 to 2 minutes, and then the kneaded composition was formed into a pellet.

(Preparation of Flame Retardant-Containing Batch)

Flame retardant-containing batches (components B) according to the reference examples were prepared as follows: the ingredients of each component B at the mass ratio shown in Table 6 were charged into a twin screw kneading extruder and heat-kneaded at 200° C. for 0.1 to 2 minutes, and then the kneaded composition was formed into a pellet.

(Preparation of Catalyst-Containing Batch)

A catalyst-containing batch (component C) according to the reference examples was prepared as follows: 5 parts by mass of polyethylene (1) and 0.05 parts by mass of the silane crosslinking catalyst were charged into a twin screw kneading extruder and were heat-kneaded at 200° C. for 0.1 to 2 minutes, and then the kneaded composition was formed into a pellet.

(Preparation of Insulated Wire)

Insulated wires were prepared as follows: the silane-grafted polyethylene-containing batch (component A), anyone of the flame retardant-containing batches (components B), and the catalyst-containing batch (component C) at the mass ratio shown in Table 6 were kneaded by using a hopper of an extruder at about 180° C. to 200° C., and subjected to extrusion processing. Conductors having an external diameter of 2.4 mm were extrusion-covered with thus-prepared compositions of the kneaded batches that were insulators having a thickness of 0.7 mm (i.e., the external diameter of the insulated wires after the extrusion-covering was 3.8 mm). Then, the compositions were water-crosslinked in a bath at a high humidity of 90% and at a high temperature of 60° C. for 24 hours.

Evaluations of the obtained insulated wires were made in terms of flame retardancy and heat resistance in accordance with the following methods. In addition, evaluations of the obtained insulated wires were made in terms of product properties (evaluations in terms of surface appearance after extrusion, and mechanical properties) in accordance with the following methods. The results are shown in Table 6.

TABLE 6

| | | Reference Example | | | | | |
|---|---|---|---|---|---|---|---|
| | | 21 | 22 | 23 | 24 | 25 | 26 |
| Component A | | 40 | 80 | 70 | 70 | 70 | 70 |
| Component B | Polyethylene (1) | 50 | 10 | 20 | 20 | 20 | 20 |
| | PP elastomer | 10 | 10 | 10 | 10 | 10 | 10 |
| | Magnesium hydroxide | 120 | 40 | 100 | 100 | 100 | 100 |
| | Phenolic antioxidant | 3 | 3 | 3 | 3 | 3 | 3 |
| | Sulfurous antioxidant | 5 | 5 | 5 | 5 | 5 | 5 |
| | Zinc oxide | 5 | 5 | 5 | 5 | 5 | 5 |
| | Copper inhibitor | 1 | 1 | 1 | 1 | 1 | 1 |
| | Subtotal | 194 | 74 | 144 | 144 | 144 | 144 |
| Component C | | 2.8 | 5.6 | 0.7 | 2.1 | 7 | 10 |
| A/(A + B) | | 0.171 | 0.519 | 0.327 | 0.327 | 0.327 | 0.327 |
| Component C content with respect to 100 parts by mass of component A | | 7.0 | 7.0 | 1.0 | 3.0 | 10.0 | 14.3 |
| Evaluation | Flame retardancy | Excellent | Good | Excellent | Excellent | Excellent | Excellent |
| | Heat resistance | Good | Excellent | Good | Excellent | Excellent | Excellent |
| | Surface appearance after extrusion | Good | Excellent | Excellent | Excellent | Excellent | Good |
| | Mechanical properties | Good | Excellent | Excellent | Excellent | Excellent | Excellent |

According to Table 6, it is shown that the insulated wires are excellent in flame retardancy or heat resistance when the mixing ratios between the components A and the components B: A/B are 10/90 to 60/40 in mass ratio (see Reference Examples 21 to 22). In addition, it is shown that the insulated wires are particularly excellent in heat resistance and have excellent surface appearance after extrusion when the contents of the components C with respect to 100 parts by mass of the components A are more than 1 part by mass and less than 14.3 parts by mass (see Reference Examples 23 to 26), and accordingly favorable insulated wires are obtained.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A flame-retardant composition comprising:
   a polymer component comprising:
      silane-crosslinked polyolefin; and
      polyolefin, the polyolefin content being 32 to 157 parts by mass with respect to 100 parts by mass of the silane-crosslinked polyolefin;
   at least one of magnesium hydroxide and aluminum hydroxide, the content of the at least one of magnesium hydroxide and aluminum hydroxide being 28 to 190 parts by mass with respect to 100 parts by mass of the polymer component;
   a phenolic antioxidant, the phenolic antioxidant content being 0.5 to 9.5 parts by mass with respect to 100 parts by mass of the polymer component;
   a sulfurous antioxidant that comprises a benzimidazole compound, the sulfurous antioxidant content being 5 to 9.5 parts by mass with respect to 100 parts by mass of the polymer component;
   a zinc oxide, the zinc oxide content being 0.5 to 9.5 parts by mass with respect to 100 parts by mass of the polymer component; and
   a copper inhibitor, the copper inhibitor content being 0.1 to 4.7 parts by mass with respect to 100 parts by mass of the polymer component,
   wherein:
   the silane-crosslinked polyolefin comprises polyethylene having a density of 0.880 to 0.910 g/cm$^3$ that is silane-crosslinked, and
   the polyolefin consists of:
      a polypropylene elastomer having a melting point of 140° C. or more; and
      a polyethylene that is the same as the polyethylene from which the silane-crosslinked polyolefin is made.

2. An insulated wire comprising the flame-retardant composition according to claim 1, and a conductor which is covered with the composition.

3. A method for producing a flame-retardant composition, the method comprising the steps of:
kneading:
- a component A that comprises silane-modified polyolefin prepared by graft polymerization of polyolefin with a silane coupling agent;
- a component B that comprises polyolefin, a metallic hydrate comprising at least one of magnesium hydroxide and aluminum hydroxide, a phenolic antioxidant, a sulfurous antioxidant that comprises a benzimidazole compound, a zinc oxide, and a copper inhibitor; and
- a component C that comprises a polyethylene having a density of 0.880 to 0.910 g/cm$^3$ and a silane crosslinking catalyst, into a composition;

molding the kneaded composition; and
water-crosslinking the molded composition, wherein
the polyolefin of component A consists of:
- a polypropylene elastomer having a melting point of 140° C. or more, and
- a polyethylene that is the same as the polyethylene of component C from which a silane-crosslinked polyolefin is made.

* * * * *